United States Patent [19]

Uchida et al.

[11] Patent Number: 4,774,547

[45] Date of Patent: Sep. 27, 1988

[54] APPARATUS FOR FORMING IMAGES

[75] Inventors: Shunji Uchida; Masaki Kakutani; Toshiharu Nishimura, all of Hachioji, Japan

[73] Assignee: Konishiroku Photo Industry Co., Ltd., Tokyo, Japan

[21] Appl. No.: 140,912

[22] Filed: Dec. 29, 1987

Related U.S. Application Data

[63] Continuation of Ser. No. 925,229, Oct. 31, 1986, abandoned.

[30] Foreign Application Priority Data

Nov. 5, 1985 [JP] Japan ................................ 60-248597

[51] Int. Cl.$^4$ .......................................... G03B 29/00
[52] U.S. Cl. .......................................................... 355/27
[58] Field of Search ..................... 355/27–29; 354/83

[56] References Cited

U.S. PATENT DOCUMENTS

| 2,031,071 | 2/1936 | Roehrl | 355/29 |
| 3,335,636 | 8/1967 | Atkinson | 354/83 X |
| 3,369,470 | 2/1968 | Downey | 354/83 X |
| 3,953,873 | 4/1976 | Tholen et al. | 355/27 X |
| 4,451,141 | 5/1984 | Thebault | 355/29 X |
| 4,573,790 | 3/1986 | Ducos | 355/28 |

Primary Examiner—Donald A. Griffin
Attorney, Agent, or Firm—Jordan B. Bierman

[57] ABSTRACT

An image forming apparatus is disclosed, in which silver halide color photographic light-sensitive materials are used. The apparatus has a scanning exposure system and a processing system for the photographic materials. Two types of photographic materials, reflective type and transparent type, can be used interchangeably. Conditions of the exposure and the processing are automatically changed according to the types of the photographic materials.

15 Claims, 4 Drawing Sheets

APPARATUS FOR FORMING IMAGES

This application is a continuation of Ser. No. 925,229, filed 10/31/86, now abandoned.

FIELD OF THE INVENTION

This invention relates to an apparatus for forming images using a positive type silver halide color photographic light-sensitive material comprising a reflective support bearing thereon positive type silver halide emulsion layers (hereinafter referred to as a reflective type light-sensitive material) and a positive type silver halide color photographic light-sensitive material comprising a transparent support bearing thereon positive type silver halide emulsion layers (hereinafter referred to as a transparent type light-sensitive material) for forming images in a photographic process.

BACKGROUND OF THE INVENTION

In recent years, the demands for color copies are on the increase, and electorinic color copiers are on sale so as to try to meet the demands. Those copiers are, however, unsatisfactory in image quality and it cannot positively be said that the demands for the color copies are fully satisfied.

On the other hand, color copiers using silver halide light-sensitive materials have also been proposed and are on sale.

The color copies using silver halide light-sensitive materials are not only excellent in image quality but also have the following advantage. Namely, this type of color copying techniques is quite excellent in providing not only reflective type copies having images on white paper but also transparent type copies having images on transparent film to see the images through transmitted light. The color images formed in an electrophotographic method are relatively poor in light transmissivity, because the image-forming toners thereof are mainly made of resins. It is, therefore, intrinsically hard to obtain high-quality transparent type images.

In the meantime, it is convenient to selectively provide both of such reflective type color copies and transparent type color copies as mentioned above with a single unit of electronic copier. In fact, this idea has popularly been adopted in electronic copiers.

Also in the case of using a copier utilizing silver halide color light-sensitive materials, both reflective type of color copies and transparent type of color copies may be obtained either with a single unit of copier, provided that both light-sensitive materials having white paper supports and those having transparent film supports are loaded therein. In the case of making transparent type color images, however, there is a problem that the photographic density of the images may be lowered even if the dye density thereof are the same as those of reflective type images. Therefore, transparent color positive images may be lowered in contrast, so that those images are apt to be impressed with a soft contrast reduction.

As a countermeasure for remedying the above-mentioned problem, it may be considered that a high contrast image may be obtained by increasing the silver content in the emulsion layers of a transparent type light-sensitive material more than that of a reflective type light-sensitive material and the color forming dye density is increased thereby so as to obtain a high contrast image. It is, however, not desired to increase the silver content, because the manufacturing costs of such light-sensitive materials are also increased.

SUMMARY OF THE INVENTION

It is, accordingly, an object of the invention to provide an apparatus for forming images capable of solving the above-mentioned problem and thereby obtaining copied images each having optimum density and contrast gradation even in the case of utilizing each of light-sensitive materials of reflective and transparent types.

The above-mentioned object of the invention can be achieved with an apparatus for forming an image comprising a means for scanning an original, a means for exposing a silver halide photographic light-sensitive material with the image of the original, a means for interchangeably setting up at least two kinds of magazines storing transparent and reflective silver halide phtographic light-sensitive materials, respectively, a means for processing the silver halide photographic light-sensitive material, a means for conveying the silver halide positive photographic light-sensitive materials through the processing means, and a means for uniformly exposing the silver halide photographic light-sensitive materials imagewise exposed; in which the light amount of the image exposure, the conveying speed of the conveying means and the light amount of the uniform exposusre are automatically changed, respectively, corresponding to the kinds of the silver halide photographic light-sensitive materials.

Namely, with the apparatus, an optimum contrast gradation and an optimum image density of every light-sensitive material can be obtained in such a manner that an image exposure amount, a developing time and a uniform exposure amount each given to the exposed areas of the light-sensitive material are automatically switched over corresponding to whether the light-sensitive material used is of the reflective type or of the transparent type.

DETAILED DESCRIPTION OF THE INVENTION

As for the light-sensitive materials used in the apparatuses of the invention, the so-called internal-latent-image type direct positive silver halide color light-sensitive materials are prefereably used. With this type of color light-sensitive materials, positive color images may be obtained in such a manner that the light-sensitive material is exposed imagewise and is then processed through the steps such as a uniform exposure, a color development, a bleach-fixation, a stabilization and the like.

The transparent type light-sensitive materials may be manufactured by making use of such a transparent support as a cellulose triacetate film, a polyethylene terephthalate film or the like, and the reflective type light-sensitive materials may be made by making use of such a reflective type support as a polyethylene-laminated paper or the like.

The silver halide photographic emulsions shall not specifically be limited to use in the above-mentioned two kinds of light-sensitive materials. It is, however, preferable to use those similar to each other and particularly preferable to use the same kind of the materials together.

There are differences between the transparent type and the reflective type of the light-sensitive materials in their optimum contrast gradation and image densities, and the light-sensitive materials differ in sensitivity according to their supports. It is, therefore, necessary to adjust the conditions of exposure, development and uniform exposure according to the types of the light-sensitive materials, either transparent type or reflective type, even if using the same silver halide photographic emulsion in both of the two types of light-sensitive materials.

The above-mentioned difference may possibly be larger between the light-sensitive materials using each a different type of silver halide emulsion.

Accordingly, in the case of using an apparatus for forming images, which is comprised of an exposure section and an image processing section each united in a body and is capable of arbitrarily replacing a transparent type light-sensitive material by a reflective type one and vice versa, the conditions of an image exposure, an uniform exposure and a development are to necessarily be switched over at the same time according to the types of the light-sensitive materials used. In the apparatuses of the invention, the above-mentioned conditions are automatically switched over so as to selectively use two types of light-sensitive materials, so that the respective optimum results can be obtained.

When using a transparent type light-sensitive material in an apparatus of the invention, the speed of conveying the light-sensitive material in a processing means is switched over to a slower speed so as to make the processing time of the light-sensitive material longer than that of a reflective type of light-sensitive material and, thereby, an image having a high density and a high contrast each suitable for transparencies can be obtained.

In this case, it is prepferred to provide the above-mentioned processing time to be from 1.2 times to 2 times longer than the processing time of transparent type light-sensitive materials.

In this way, transparent positive images having a substantially higher maximum density and suitable for seeing through a projector or the like can be obtained.

Further, in this invention, the light amounts of image exposures are varied in accordance with reflective type light-sensitive materials and transparent type ones used, respectively. As for the means for varying the light amounts of exposures, various means may be used, such as those for changing the speed of conveying a light-sensitive material in the position of exposure, those for changing an aperture for exposure, those for varying an electric power being supplied to the light source, and the like.

In addition, it is desired that the above-mentioned image exposure adjustments may be applied not only to the difference between the types of light-sensitive materials but also to the difference in photographic characteristics between the light-sensitive materials used.

In the apparatuses of the invention, the light amount of uniform exposure is necessary to form a positive image on an internal-latent-image type light-sensitive material, and such light amount is switched over corresponding to whether the light-sensitive material used is of the reflective type or of the transparent type. In this case, the color of the light used may be changed if occasion demands.

Further, the above-mentioned uniform exposure is to be adjusted not only in accordance with the difference between the reflective type of light-sensitive materials and the transparent type ones but also in accordance with the kinds of light-sensitive materials respectively, because there can be many light-sensitive materials having variously different characteristics if they are of the reflective type, for example, so that an excellently finished image can be obtained.

In the embodiments of the invention, it is desired that the proportion of the fresh processing liquid replenished into a processing tank is to be varied in accordance with the respective light-sensitive materials of reflective type and of transparent type used.

The reasons thereof are that the processing time of a transparent type light-sensitive material is relatively longer than that of a reflective type light-sensitive material and that the consumption of a processing liquid is relatively greater in processing the transparent type one than in the reflective type light-sensitive material when the amount of silver coated is increased to the transparent type one so as to improve the characteristics thereof.

In addition to the above, the proportions of bleacher, fixer and stabilizer each replenished are also changed, respectively.

In the case of the transparent type light-sensitive materials, it is preferred to replenish a replenisher in a proprtion from 1.1 times to 2 times as much as in the case of the reflective light-sensitive materials.

In the apparatuses of the invention, the imagewise exposure, uniform exposure and conveying speed of a light-sensitive material in the processor are automatically switched over in accordance with the types of the light-sensitive material used. The switching methods are preferably comprised of providing each magazine with a means for discriminating the kinds of magazines and also providing the means for setting up a magazine of the main body of the apparatus with a means for detecting the discriminating means and sending discrimination signals when loading a magazine so that a control unit provided to the main body of the apparatus may be operated by the signals so as to switch the values of an imagewise exposure, a conveying speed and a uniform exposure to the predetermined values respectively in accordance with the kinds of the light-sensitive materials used.

As for the magazine discriminating means, a variety of well-known means may be used, such as configurational ones having a protrusion, a depression provided onto the surface of a magazine, optical ones having a different color on a part of a magazine and besides electric or magnetic ones. As for the deteting means thereof, a variety of sensors and the like may also be used, provided that they are suitable for the discriminating means.

An object of the invention is to provide transparent type positive images having a relatively less amount of silver coated and a relatively higher contrast. A transparent type light-sensitive material can provide more excellent photographic images than a reflective type light-sensitive material, provided that the former is coated with emulsion layers each having silver coated in an amount equivalent to or more than the latter has. Ordinarily, color light-sensitive materials have a red-sensitive emulsion layer, a green-sensitive emulsion layer, a yellow filter layer and a blue-sensitive emulsion layer, respectively. In the case of the transparent type light-sensitive materials, each emulsion layer thereof is to be coated with an emulsion containing silver from 0.9 times to 2 times as much as those of the reflective type light-sensitive materials, and thereby excellent images can be obtained in either cases of reflective images and transparent images.

Figure 1:
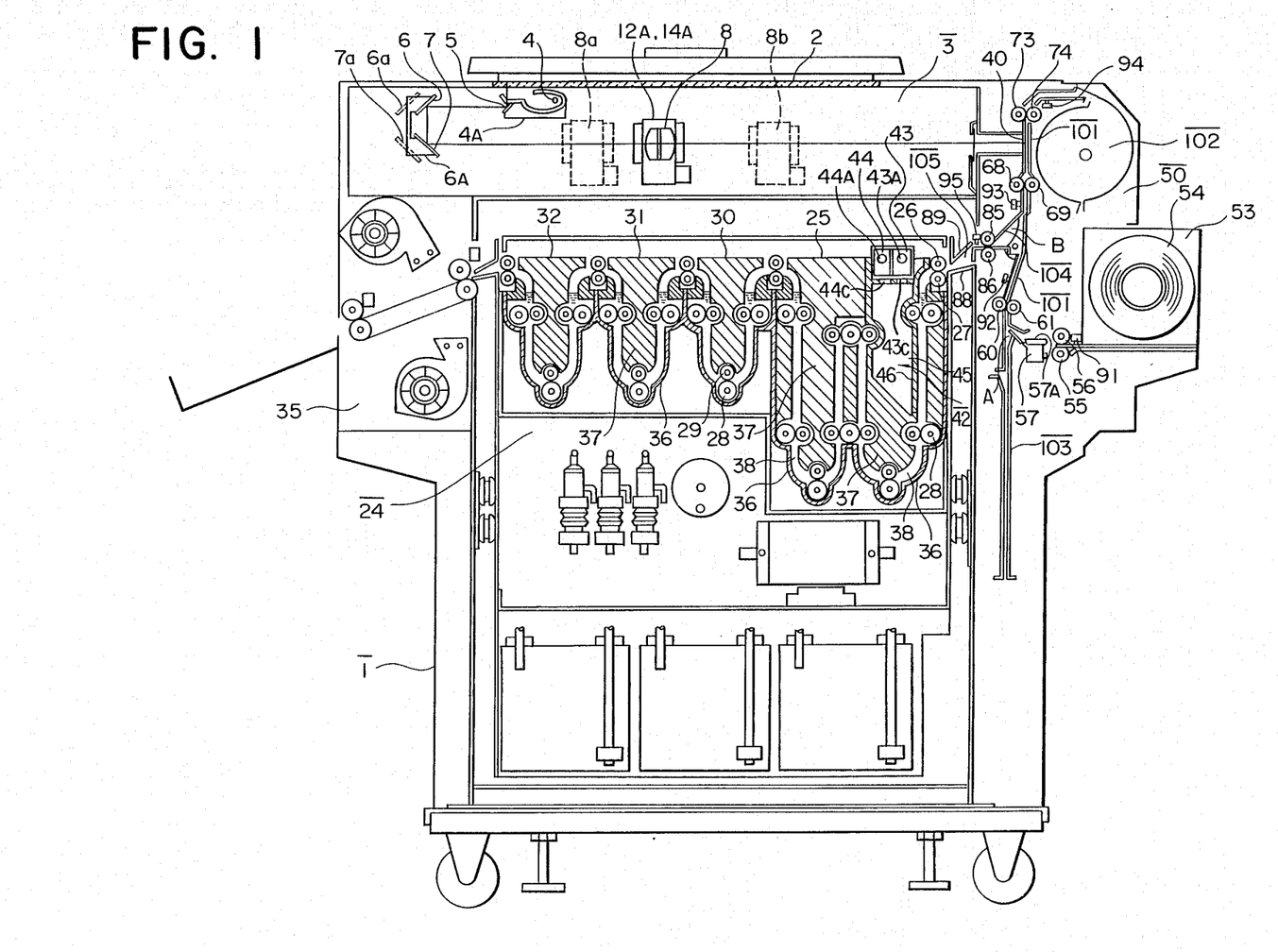
FIG. 1 is a schematic cross sectional view of an apparatus for forming images, which is one of the embodiments of he invention.
Figure 2:
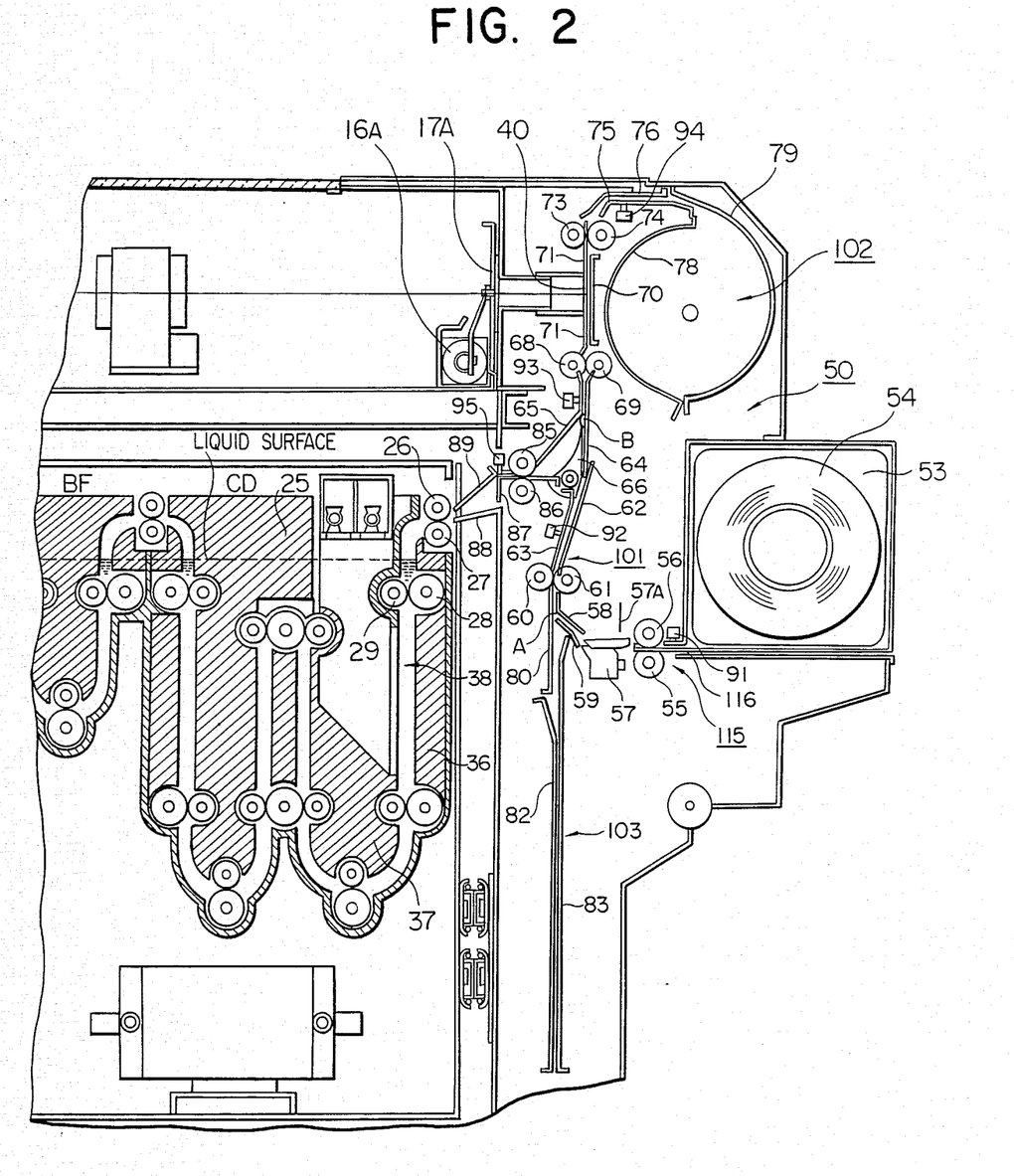
FIG. 2 is a schematic cross sectional view of the light-sensitive material supplying and conveying section of the apparatus shown in FIG. 1.

The apparatuses of the invention and the operations thereof will now be described in the following drawings wherein FIGS. 1 and 2 show schematic sectional views of an embodiment of the image forming apparatuses capable of embodying an image forming method relating to the invention.

The image forming apparatus for reflective type or transparent type light-sensitive materials (hereinafter simply called a light-sensitive material, provided that the light-sensitive material is not expressly specified) is comprised of a light-sensitive material supplying and conveying section 50, an exposure means 3 including a movale optical system for slitwise scanning and exposing an original on an original table and a processing section 24 for carrying out development, bleach-fixation, stabilization and drying.

The light-sensitive material supplying and conveying section 50 is provided to be united in a body to the right-hand side of the exposure means 3 and the processing section 24. A magazine 53 loaded with a light-sensitive material roll 54 is attached to the right side end of the supplying and conveying section 50, and the leading edge of the light-sensitive material roll is sandwiched between a supplying roller 55 and a pressure roller 56 coming into contact with the supplying roller 55. There are provided in succession with a light-sensitive material cutter 57 driven by a cutter-motor and further with a light-sensitive material conveying passage 101 comprising guide plates 58, 59, 80, 62, 63, 64, 65, 70, 71, 75 and 76 and a movable guide plate 66 at the second branch point B which will be described later, and still further with both of conveying rolls 60, 68 and 73 driven synchronously with the above-mentioned supplying roller 55 and rollers 61, 69 and 74 each so made as to be capable of coming into pressure contact with the above-mentioned supplying rollers, in the widway of the conveying passage 101. In addition, following the conveying passage 101, the upper part of the passage is connected with a light-sensitive material widing up stocker 102 comprising guide members 78 and 79 each having a semicurcular section.

The first branched passage 103 is formed by jointly using both of guide plates 82 and 83 and the guide plates 58, 59 and 80 of the above-mentioned conveying passage 101 and is provided to the lower part of the conveying passage 101, so that the first branched passage 103 is provide so as to be branched at the first branch point A in the midway of the above-mentioned guide plate 58.

The second branched passage 104 is formed, at the second branch point B, by comprising guide plates 65, 87 and movable guide plate 66, and conveying roller 85 driven synchronously with the above-mentioned conveying rollers 60, 68, 73 and pressure roller 86 coming into pressure contact with the conveying roller 85 are provided to the midway of the above-mentioned second branched passage 104.

The top of the above-mentioned second branched passage 104 is provided with an entry sensor 95 of the automatic processor and this top is connected to connecting passage 105 which is comprised of guide plates 88, 89 leading to processing section 24.

Sensor 91 for detecting the leading edge of a film roll loaded in a magazine 53 is provided to the neighborhood of supplying roller 55 near by the magazine 53, the first sensor 92 for detecting jams is provided to the midway of the passage 101 above conveying roller 60 and paper size sensor 93 is provided to a position above the second branch point B and below conveying roller 68 and further the second sensor 94 for detecting jams is provided to a position above conveying roller 73, respectively.

Further, exposure section 40 is provided to a position of the passage 101 between conveying rollers 68 and 73.

Each of conveying rollers 60, 68, 73, 85 and supplying roller 55 is driven by a DC servomotor through a driveing transmission means, a high-speed clutch and the brake thereof and a slow-speed clutch and the brake thereof. The DC servomoter is so made as to obtain a higher revolution speed and a slower revolution speed by switching a clock frequency over to another. Each of the above-mentioned conveying rollers is so made as to obtain the conveying speeds of 100 mm/s and 300 mm/s when the above-mentioned high-speed clutch is engaged with. Also, an ultra-low-speed conveyance of from 4 mm/s to 7 mm/s may be switched over by engaging with the above-mentioned low-speed clutch incorporated with a speed reduction means. The supplying roller 55 is driven by a drive transmission means engaged with the above-mentioned high-speed clutch and the brake thereof through an exclusive clutch for the supplying roller 55 use only when a light-sensitive material is fed into the first conveying passage 101 and the driving is stopped in motion after the cutting operation is completed.

Exposure means 3 is arranged to the upper part of image forming means 1 so as to scan an original on an original table by making use of an exposing lamp 4 with a reflector mirror and reflector mirror 5 provided onto the first movable board 4A and reflector mirrors 6, 7 and projection lens 8 provided onto the second movable board 6A and to focus the original image on the exposure section 40. In this instance, the scanning speed on the first movable board 4A is made double as fast as the moving speed of the second movable board 6A and the length of the optical path is made constant between each of the scanning positions on an original and the exposure section 40. When enlarging an original image by 1.5 times as large as the original in actual size of reducing by 0.5 times as small as the actual original size, the reflector mirrors on the second movable board 6A are so designed as to be reset to positions 6a and 7a, respectively. And, the projection lens 8 is so designed as to be reset to the position 8a when enlarging and to the position 8b when reducing, respectively. The movements thereof are operated by a zoom-motor.

In addition, the projection lens is provided with aperture diaphragm 12A which is driven by a diaphragm motor so as to adjust the light amount predetermined for each of light-sensitive materials in accordance with the signals given from the detecting means of the magazine loading section. Also, in the neighborhood of the aperture diaphragm 12A, there are provided a filter frame 14A for compensating a color balance and a filter motor for so driving as to adjust the filter frame 14A.

There is also provided in the vicinity of exposure section a shutter means 17A operated by a solenoid 16A. The shutter 17A is so closed as to prevent a light-sensitive materials from light-leaking into the supplying and conveying section 50, except that the shutter is opened when imagewise exposing and scanning.

The processing section 24 is provided below the exposure means and is connected to the light-sensitive material supplying and conveying section 50, and an exposed light-sensitive material being supplied therein is conveyed into color developing tank 25 through guide rollers 26, 27. The processing tanks are arranged in succession by order of the above-mentioned color developing tank 25, a bleach-fixing tank 30, a first stablizing tank 31 and a second stablizing tank 32. Developers and bleach-fixers are replenished in every constant amount thereinto from each of the replenishing tanks (not shown), by a pump. In the course of such replenishments, each of the replenishers is mixed up with the circulating processing liquid in each of the processing tanks and is replenished with heating up to a suitable temperature by a thermoregulating device. The first and second stabilizers are replenished each in a constant amount from each of the replenishing tanks (not shown), so that each of the processing liquids may be maintained in each of the tanks at a constant level while they are sometimes overflowed. Each of the tanks is provided with outside guide frame 36 to which drivable conveying rollers 28 are provided at regular intervals and each tank is also provided with an inside guide frame 37 and pressure rollers 29 each coming into pressure contact with the above-mentioned drivable conveying rollers 28, respectively, so that conveyance passage 38 is formed in each tank by comprising both of the frames 36, 37 and the roller sequence of the rollers 28, 29.

In the stage where a light-sensitive material is conveyed into the first conveying passage in the color developing tank 25, the light-sensitive material is uniformly exposed to light in liquid by making use of uniform exposure means 42. This uniform exposure means 42 is provided with lamp houses 43, 44 to which cold cathode ray tubes 43A, 44A are equipped, respectively. The irradiation windows of the lamp houses are attached with color compensation filters 43C, 44C, respectively, so as to supply irradiation chamber 45 with component light corresponding to the kinds of the light-sensitive materials. Namely, the cold cathode ray tubes 43A, 44A are switched over from one to another to irradiate a proper component light by a signal given from the detection sensor 114 of a magazine loading section, corresponding to the kinds of light-sensitive materials. As described above, every light-sensitive material being conveyed is uniformly exposed to the component light properly suitable for the light-sensitive material through exposure window 46.

Thus, the exposed light-sensitive material is handled in such a manner that it is conveyed through every passage 38 of the tanks while being sandwiched between each of the conveying rollers 28 and the pressure rollers 29 thereof each arranged at predetermined intervals into the passages and then conveyed into drying chamber 35 while being applied with a photographic chemical-reaction and therafter it is finished and delivered.

Every light-sensitive material conveying roller 28 in processing tanks is connected to an AC speed control motor through a drive transmission device comprising worms and the worm wheels thereof, spiral gears and spur wheels in combination. The light-sensitive material conveying speeds are controlled in such a manner that the AC speed control motor is connected directly to an encoder and the self generating electric power of the motor in its own is detected by the tachogenerator of the encoder and the result of the detection is so fed back as to control electric current and voltage, so that the conveying speeds may be controlled. The conveying speed is switched by the above-mentioned control over to a desired speed out of several prescribed speeds and the conveyance may be thereby driven. The speed is automatically switched over to another in accordance with a signal given by sensor 114 in correspondence with the kinds of light-sensitive materials.

A jam detection sensors are provided at the exit of the color developing tank, the exit of the bleach-fixing tank, the exits of the first and second stabilizing tanks and the entrance and the exit of the frying chamber so as to readily determine where a remedy should be taken when a malfunction of conveyance. Each tank also has a liquid level sensor and a liquid temperature sensor so as to keep a properly suitable development conditions.

Every constitution of the sections has been described above and the functions and operations of the light-sensitive material supplying and conveying section will now be described below with reference to FIG. 2.

Figure 3:
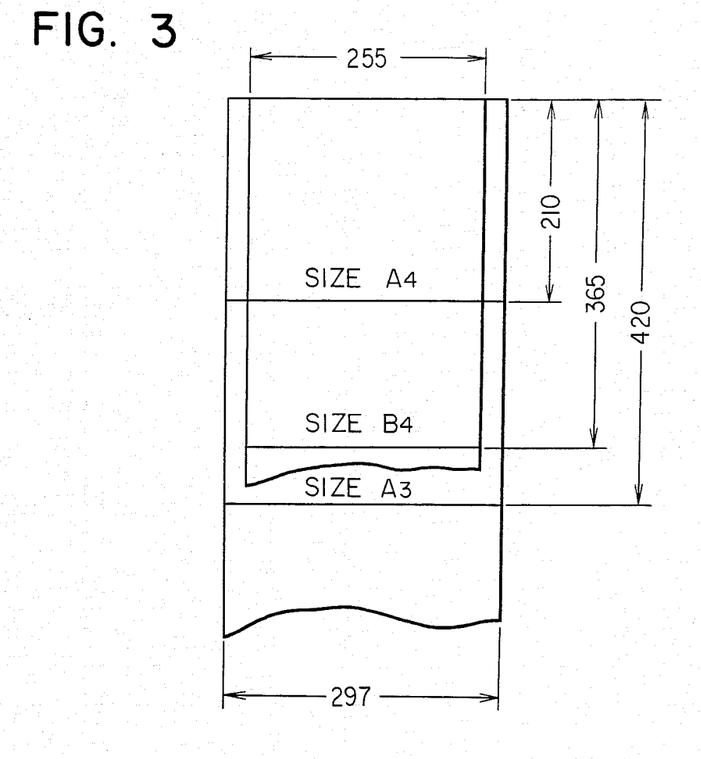
FIG. 3 is a dimensional illustration of a light-sensitive material applied to an embodiment of the invention.

In the embodiment of the image forming apparatuses of the invention, it is so designed as to form images on light-sensitive materials in three sizes of A4, A3 and B4. In the both cases of A4 and A3 sizes, a light-sensitive material roll of 297 mm in width is commonly used, and in the case of B4 size, those in the other width is used. The measurements in length are 210 mm for A4 size, 420 mm for A3 size and 364 mm for B4 size. It is, however, a matter of course that the invention shall not be limited thereto but shall be applicable to any sizes of light-sensitive materials.

A light-sensitive material roll 54 in a magazine 53 starts to be conveyed in accordance with every setting of required copies in number, required copy size, the kind of light-sensitive material to be copied and such an operation of a command delivery means as the making of a copy-start button of an operational section, and the leading edge of the light-sensitive material passes through cutting sectio 57 and goes up through a passage at a speed of 100 mm/s and passes through conveying rollers 60, 61 and the jam detection sensor 92 and reaches the position of light-sensitive material size sensor 93, so that the light-sensitive material size sensor 93 is switched ON. This position of the sensor 93 is 199.5 mm away from light-sensitive material cutting position 57A. In this position, the light-sensitive material is further conveyed by a length of the difference between 199.5 mm and the measurement length of A4, A3 or B4 size in accordance with the readout obtained by having made the button in advance. For example, the lengths of the difference are as follows:

In the case of A4 size, $210 - 199.5 = 10.5$ mm

In the case of A3 size, 420−199.5=220.5 mm and
In the case of B4 size, 364−199.5=164.5 mm.

The frequency of a timer is 3 ms per count and the conveying speed is 100 mm/s. Therefore, one pulse corresponds to 0.3 mm. Accordingly, the counter is to be set to the following values:

In the case of A4 size, 10.5 mm/0.3 mm=35 pulses
In the case of A3 size, 220.5 mm/0.3 mm=735 pulses and
In the case of B4 size, 164.5 mm/0.3 mm=548 pulses.

If a pulse motor is connected directly to the high-speed clutch and the brake thereof and is stopped in driving until the above-mentioned pulses are counted up, each of the sizes may accurately be measured.

At this point, cutter 57 operates to cut off the already measured precedent portion of a light-sensitive material roll 54, so that the portion thereof is made up into a sheet-formed light-sensitive material. At the point of time when a power transmission clutch is disengaged from the motor, the remaining light-sensitive material roll is ceased from being drawn out of the magazine and stands ready for the next operation as it is. The sheet formed light-sensitive material is sandwiched between the respective conveying rollers so as to be conveyed upward, and the leading edge thereof is wound up into widing stocker 102, and when the trailing edge thereof passes through the above-mentioned light-sensitive material sensor 92, the sensor is switched over to OFF and, after then, the high-speed clutch connecting to the pulse motor is disengaged and at the same time the brake is applied at every point of time when the counter counts up to 303 counts (i.e. 90.9 mm in length). In this manner, the trailing edge of the sheet-formed light-sensitive material stops in movement at a position which is 90.9 mm forward of the position of the light-sensitive material sensor and is also 20 mm above the exposure section 40, so that the loading of the light-sensitive material is completed to be ready for an exposure to light. Now, the sheet-formed light-sensitive material is ready for the next exposure process. Synchronizing with the start in the original scanning operation of the above-mentioned exposure means, the above-mentioned light-sensitive material is so reversely conveyed as to be switched back at a speed of 100 mm/s through conveying passage 101 by the reverse drive of the motor.

The synchronization with the above-mentioned exposure means is made by determining a drive start timing of the conveying system in accordance with ON signals given by the start-sensor of the optical system. The drive start timing is selected out by a timer setting time, i.e., 0.4×M×0.2 sec, which is determined in accordance with a copy magnification ratio M.

Whether an exposure is completed or not is judged by measuring a converyance time of a sheet-formed light-sensitive material. The conveyance time is computed by the formula, $$\frac{\text{Sheet-formed light-sensitive material} + 30 \text{ mm}}{100 \text{ mm/s}} \text{ (sec)}$$

and, the following programs are inputted,
In the case of A4 size, 2.40 sec=800 pulses
In the case of B4 size, 3.94 sec=1313 pulses and
In the case of A3 size, 4.50 sec=1500 pulses.

When counted the above-mentioned pulses, the high-speed clutch is disengaged and the brake thereof is applied at the same time. It is needless to say that the trailing edge of the sheet-formed light-sensitive material stops at a position 30 mm−20 mm=10 mm passes over from exposure section 40, when completed an exposure. The leading edge thereof passed over the first branch point A and is in the first branched passage 103.

After completing the exposure, the above-mentioned sheet-formed light-sensitive material has to be conveyed into processing section 24. Therefore, the light-sensitive material is to be switched back again in such a manner that the light-sensitive material is reversely conveyed at a high-speed of 300 mm/s, through the first branched passage 103 and the passage 101, by making the leading edge serve as the trailing edge and switching a driving motor (i.e., a DC servomotor) over to a high-speed revolution mode so as to reversely rotate conveying rollers 60, 61, 68, 69 73, 74, respectively and, thereby conveying the leading edge (i.e., the former trailing edge) into the widing stocker 102 and disengaging the high-speed clutch from the driving motor (i.e., the DC servomotor) and applying the brake at the same time according to the OFF signals given from the sensor at the point of time when the trailing edge (I.e., the former leading edge) passes over the above-mentioned light-sensitive material sensor 93 and, then, stopping the light-sensitive material in movement; and, after the switch-back is completed, the movable guide plate 66 at the second branch point B is opened in the direction of opening the second branched passage by a gate solenoid so as to start on conveying the sheet-formed light-sensitive material at a high-speed of 300 mm/s with changing the trailing edge again to serve as the leading edge and the high-speed conveyance of 300 mm/s is switched over to any of a slow-speed conveyance within the range between 4 mm/s and 7 mm/s according to the kinds of the light-sensitive materials used at the time when the leading edge passes over automatic processor presensor 95 and reaches a point 33.5 mm away therefrom, so that the light-sensitive material may be conveyed into color developing tank 25 from connecting passage 105 and each of the conveying rollers 28, 29 may also be synchronously driven at the above-mentioned speed between 4 mm/s and 7 mm/s by a speed control motor which drives the processing section. The light-sensitive material may therefore smoothly be delivered. When the trailing edge of the light-sensitive material passes over the automatic processor presensor 95, the sensor 95 sends an OFF signal. At this point of time, one copying process is completed. Responding to this signal, a clutch to supplying roller 55 is engaged, so that the next copying operation may be ready.

It takes about 11 sec from the moment of starting the next copying operation until the leading edge of the next light-sensitive material reaches a position of slowing the next conveyance down to a speed between 4 mm/s and 7 mm/s from 300 mm/s at the entrance of the automatic processor. The trailing edge of the previous-sheet-formed light-sensitive material is conveyed at a speed between 4 mm/s and 7 mm/s. Therefore, the trailing edge thereof precedes the leading edge of the next one with an interval of from 44 mm to 77 mm, so that the interval therebetween in each of the processing tanks is from 44 mm−33.5 mm=0.5 mm to 77 mm−33.5 mm=43.5 mm.

Figure 4:
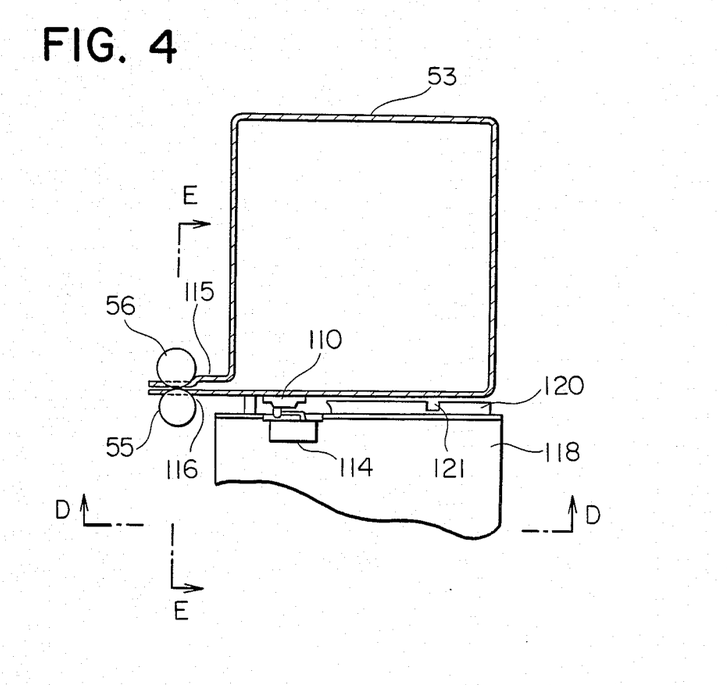
FIG. 4 is a cross sectional side view of a light-sensitive material magazine which is loaded onto a pedestal.
Figure 5:
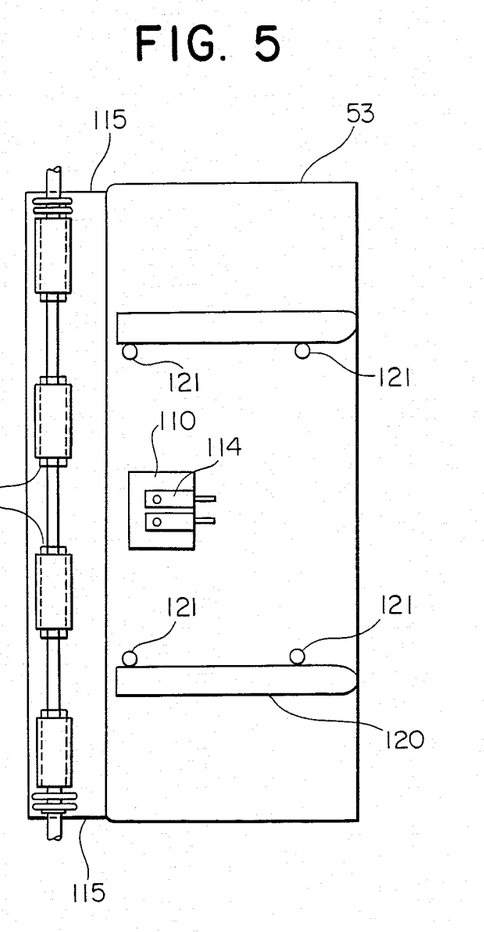
FIG. 5 is a transverse sectional view taken generally along line D—D of FIG. 4.

Should there be a jamming in the course of a conveyance, a judgement on whether a sheet-formed light-sensitive material is being conveyed normally or abnormally is made according to each of the ON and OFF combinations of the first jam detection sensor 92, light-sensitive material size sensor 93 and the second jam detection sensor 94, at the respective sensing points of time. Should there be an abnormality, the locations of the mechanical abnormality are so indicated as to be readily remedied. The magazines 53 loaded in the above-mentioned supplying and conveying section are provided with such a discriminating means as shown in FIGS. 4 and 5 so as to readily discriminate the types of light-sensitive materials, a reflective type or a transparent type. Namely, every magazine for exclusive use of the respective types of light-sensitive materials is provided with its own peculiar cam-shaped protrusion 110 which is to be detected by a sensor 114 attached to the main body of the apparatus and is then connected to an automatically discriminated circuit, so that a switchover may be so made as to be compatible with the requirements of a particular type of light-sensitive materials, such as the requirements of an imagewise exposure, a conveyance speed in the course of processing and a uniform exposure. Each magazine should accurately be set to the cardinal position to make the above-mentioned discrimination accurate and to convey light-sensitive materials having the respective widths and sizes with regulating the widthwise position thereof accurately. For the above-mentioned purposes, each magazine is provided with a regulation pin 121. The magazine is loaded into an apparatus while the regulation pin 121 is guided along regulation rail 120 fitted to pedestal 118, so that the magazine can accurately be maintained in its proper position.

Figure 6:
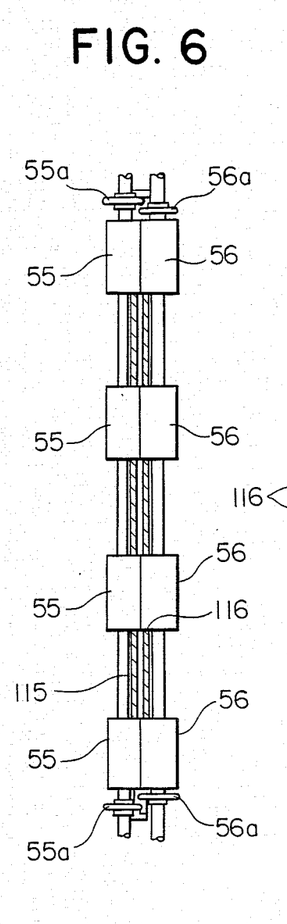
FIG. 6 is a transverse sectional view generally taken along line E—E of FIG. 4.

The light-sensitive material delivery outlet 115 of a magazine 53 containing a light-sensitive material roll 54 is lip-shaped. When inserting this lip-shaped member between supplying rollers 55, 56 as shown in FIGS. 4 through 6, the above-mentioned rollers 55, 56 enter into the window 116 provided to the lip-shaped member of the delivery outlet 115 so that a light-sensitive material can immediately be drawn out of the magazine when starting an operation. In this case, both ends of each shaft are provided with plastic-made rollers 55a, 56a which are little larger in outside diameter than the supplying rollers 55, 56, respectively. The plastic-made rollers guide the roller assembly by coming into contact with the lip-shaped delivery outlet 115 of the magazine 53, so that the light-sensitive material supplying rollers 55, 56 may not be damaged. After the rollers inserted into the window 116, rollers 55, 56 come into contact with the light-sensitive material, however, the positions of roller 55a, 56a are so shifted as not to come into contact with the light-sensitive material as shown in FIGS. 5 and 6. As described above, an operation may be ready for start with a single action by loading a magazine onto pedestal 118 of supplying and conveying section 50.

An embodiment using an apparatus of the invention will now be described below.

The silver halide photographic light-sensitive material used in this embodiment was more specifically an internal-latent-image type multiplayered color light-sensitive material which was prepared in the following process.

A surface-treated and polyethylene-laminated paper and a surface-treated polyethyleneterephthalate film were respectively coated thereon with nine kinds of layers from a red-sensitive emulsion layer to a protective layer described below in a simultaneous layer coating process and dried. As aforementioned, hereinafter, the former is called simply a reflective type light-sensitive material and the latter is a transparent type light-sensitive material, respectively. Red-sensitive emulsion layer (the 1st layer):

A 20% solution of inert gelation was maintained at 50° C. and was added at the same time with the following solutions A and B taking three minutes for stirring. After being ripened for 40 minutes and then removed excess salts therefrom in a sedimentation and washing process, the following solutions D and E were added thereinto so as to laminate silver chlorobromide comprising AgCl of 95 mol % and AgBr of 5 mol % over to the surface of this layer. An excess of water-soluble salts were removed again in the sedimentation and washing process and a small amount of gelatin was then added so as to be dispersed.

| Solution A: | Pure water | 500.0 ml |
| | NaCl | 40.0 g (137 mol %) |
| | KBr | 8.9 g (15 mol %) |
| | KI | 0.4 g (0.5 mol %) |
| Solution B: | Pure water | 600 ml |
| | Ag NO$_3$ | 85 g |
| Solution C: | Pure water | 300.0 ml |
| | KBr | 50.6 g (85 mol %) |
| Solution D: | Pure water | 1500.0 ml |
| | NaCl | 20.0 g (114 mol %) |
| | KBr | 1.8 g (5 mol %) |
| Solution E: | Pure water | 500.0 ml |
| | AgNO$_3$ | 51.0 g (0.3 mol %) |

Thereafter, the resulted emulsion was added with suitable amounts of spectral sensitizers [D-1] and [D-4], a solution containing both of 2,5-dioctyl hydroquinone which was protectively dispersed with dibutyl phthalate and cyan coupler [CC-1], 4-hydroxy-6-methyl-1,3,3a,7-tetraazaindene, 1-phenyl-5-mercaptotetrazole and, besides the above, a gelatin and coating assistant [S-1]. The resulted emulsion was coated over so as to be 0.4 g/m$^2$ in an amount of silver coated.

The first interlayer (the 2nd layer):

A gelatin solution was prepared so as to contain 2,5-dioctyl hydroquinone and a UV absorbing agent, Tinuvin 328 (manufactured by Ciba Geigy AG), both of which were dispersed in dioctyl phthalate, and a coating assistant [S-1]. The resulted gelatin solution was coated so as to be 0.15 g/m$^2$ in the amount of Tinuvin 328 coated.

Green-sensitive emulsion layer (the 3rd layer):

A silver halide emulsion was prepared in the same manner as in the case of the above-mentioned red-sensitive emulsion. The resulted emulsion was added with suitable amounts of spectral sensitizer [D-2], a solution containing both 2,5-dicotyl hydroquinone pretectively dispersed with dibutyl phthalate and magenta coupler [MC-1], 4-hydroxy-6-methyl-1,3,3a,7-tetrazaindene, 1-phenyl-5-mercaptotetrazole and besides a gelatin and coating assistant [S-2], respectively. The resulted emulsion was so coated as to be 0.4 g/m$^2$ in an amount of silver coated.

The second interlayer (the 4th layer):

With the same formula, a coating was so made as to be 0.2 g/m$^2$ in an amount of Tinuvin 328 coated.

Yellow filter layer (the 5th layer):

A 2,5-dioctyl hydroquinone solution dispersed together with both of yellow colloidal silver prepared through an oxidation process in the presence of an alkaline weakly reducing agent (from which the weakly reducing agent was removed in a noodle-washing process applied after a neutralization) and dioctyl phthalate, coating assistant [S-2] and hardening agent [H-1]

(which was added immediately before the coating) were added together. The resulted matter was coated over so as to be 0.15 g/m² in an amount of silver coated.

The third interlayer (the 6th layer):

With the same formula as in the first interlayer, a coating was so made as to be 0.15 g/m² in an amount of Tinuvin 328 coated.

Blue-sensitive emulsion layer (the 7th layer)

The following solutions A and B were added at the same time into a 15% solution of inert gelation over a period of 15 minutes while keeping at 60° C. with stirring. After 15 minutes, the following solution C was poured thereinto over a period of 2 minutes. After one minute, hypo was further added thereinto in an amount equivalent to 3 mg/Ag and the resulted matter was ripened for 40 minutes. When the composition sampled therefrom was analyzed, it was silver chlorobromide comprising AgCl of 4 mol %, AgBr of 96 mol % and AgI of 2 mol %, respectively.

After the excessive salts were removed in a sedimentation-washing process, The following solutions D and E were added. After the surface layer comprising AgCl of 97 mol % and AgBr of 3 mol % was laminated, the remaining excessive salts were removed again in the sedimentation-washing process, gelatin for dispersing use was added.

| Solution A: | Pure water | 1000 ml |
| | NaCl | 76 g |
| | KBr | 17 g |
| | Hexachloroiridium (III) acid salt | $2 \times 10^{-5}$ g |
| Solution B: | Pure water | 1000 ml |
| | AgNO₃ | 169.9 g |
| Solution C: | Pure water | 800 ml |
| | KBr | 103 g |
| | KI | 3.3 g |
| Solution D: | Pure water | 500 ml |
| | AgNO₃ | 51 g |
| Solution E: | Pure water | 500 ml |
| NaCl | | 25.8 g |
| KBr | | 1.1 g |

A coating solution was prepared by adding spectral sensitizer [D-3], a solution containing yellow coupler [YC-1] dispersed with dioctyl phthalate, 2-mercaptobenzothiazole, 4-hydroxy-6-methyl-1,3,3a,7-tetrazaindene, gelatin, coating assisant [S-3] and hardening agent [H-2] (which was added immediately before coating). The resulted coating solution was added to the above-mentioned silver halide emulsion and the resulted mixture was coated over so as to be 0.5 g/m² in an amount of silver coated.

The fourth interlayer (the 8th layer):

This layer was coated in the same manner as in the first interlayer so as to be 0.3 g/m² in an amount of Tinuvin 328 coated, provided that hardening agent [H-2] was added in this layer.

Protective layer (the 9th layer):

A gelatin solution containing colloidal silica, coating assistant [S-3] and hardening agents [H-2] and [H-3] (which were added immediately before coating) was so coated as to be 1.0 g/m² in terms of an amount of the gelatin coated.

Cyan coupler [CC-1]

Magenta coupler [MC-1]

Yellow coupler [YC-1]

Spectral sensitizer [D-1]

Spectral sensitizer [D-2]

Spectral sensitizer [D-3]

Spectral sensitizer [D-4]

Coating assistant [S-1]

Coating assistant [S-2]

Coating assistant [S-3]

Hardening agent [H-1]

Hardening agent [H-2]

[structure: cyanuric chloride mono-sodium salt with Cl, Cl, ONa substituents]

Hardening agent [H-3]

$H_2C=HCO_2S-N\underset{\underset{SO_2CH=CH_2}{N}}{\overset{}{\bigcirc}}N-SO_2CH=CH_2$ In this example, the typically photographic processing requirements are as follows:

| Processing step | | Reflective type positive light sensitive material | Transparent type positive light sensitive material |
|---|---|---|---|
| | | (Processing temperature and time) | |
| [1] Dipping (in a developer) | 38° C. | 8 sec | 9.6 sec |
| [2] Uniform exp. | — | 10 sec/1 Lux | 12 sec/1 Lux |
| [3] Color dev. | 38° C. | 120 sec | 144 sec |
| [4] Bleach-fix | 35° C. | 60 sec | 72 sec |
| [5] Stabilizing | 25–30° C. | 90 sec | 108 sec |
| [6] Drying | 75–80° C. | 60 sec | 72 sec |

Composition of the processing liquids:

(Color Developer)

| | |
|---|---|
| Benzyl alcohol | 10.0 ml |
| Ethylene glycol | 15.0 ml |
| Potassium sulfite | 2.0 g |
| Potassium bromide | 1.5 g |
| Sodium chloride | 0.2 g |
| Potassium carbonate | 30.0 g |
| Hydroxylamine sulfate | 3.0 g |
| Polyphosphoric acid (TPPS) | 2.5 g |
| 3-methyl-4-amino-N—ethyl-N—(β-methanesulfonamidethyl)-aniline sulfate | 5.5 g |
| Optical brightening agent (a 4,4′-diamino-stilbenesulfonic acid derivative) | 1.0 g |
| Potassium hydroxide | 2.0 g |
| Water to be added to make (in total) | 1000.0 cc |
| The pH value to be adjusted to | pH 10.20 |

(Bleach-Fixer)

| | |
|---|---|
| Ferric ammonium ethylenediamine-tetraacetate, dihydrate | 60.0 g |
| Ethylenediaminetetraacetic acid | 3.0 g |
| Ammonium thiosulfate (a 70% solution) | 100.0 ml |
| Ammonium sulfite (a 40% solution) | 27.5 ml |
| The pH value to be adjusted with potassium carbonate or glacial acetic acid to | pH 7.1 |
| Water to be added to make (in total) | 1000.0 cc |

(Stabilizer)

| | |
|---|---|
| 5-chloro-2-methyl-4-isothiazoline-3-one | 1.0 g |
| Ethylene glycol | 10.0 g |

| | |
|---|---|
| -continued | |
| 1-hydroxyethylidene-1,1'-diphosphonic acid | 2.5 g |
| Bismuth chloride | 0.2 g |
| Magnesium chloride | 0.1 g |
| Ammonium hydroxide (a 28% aqueous solution) | 2.0 g |
| Sodium nitrilotriacetate | 1.0 g |
| Water to be added to make (in total) | 1000.0 cc |
| The pH value to be adjusted with ammonium hydroxide or sulfuric acid to | pH 7.0 |

As for the stablizing system, a double tank type counter-current system was adopted, as described before.

The requiremens for the processing steps applied to the above-mentioned reflective type light-sensitive materials were that the color developing time including a dipping uniform exposure step was 138 sec at 38° C., the bleach-fixing time was 60 sec at 35° C. and the stablizing time was 90 sec at a temperature of from 25° to 30° C., and the requirements applied to the transparent type light-sensitive materials were 165 sec. 72 sec and 108 sec, respectively. In ether cases, they were properly finished.

As described above, both of the reflective type and transparent type light-sensitive materials of this example have the same layer arrangement, but, notwithstanding, the transparent type ones can not provide any color reproduced images equivalent to those provided by the reflective type ones unless the processing time is prolonged, because the difference between the support materials. In order to achieve the aforementioned objects, this embodiment was so devised as to convey an imagewise exposed light-sensitive material through each of the developing, bleach-fixing and stablizing tanks at a conveying speed slowed down from about 7 mm/s to about 5.8 mm/s to meet the prolonged processing time.

Further, there is provided to this embodiment of the apparatus a device for switching a conveying speed in the processing section over to another in such a manner that, as both of the light-sensitive materials are put respectively into the magazines each having a peculiarly protruded cam as aforedescribed, each of the protrusions is detected to make the discrimination circuit when such a magazine is loaded into this apparatus, so that the switch over may be made.

With the apparatuses of the invention, both of the transparent type light-sensitive materials, that is, the positive type silver halide color photographic light-sensitive materials provided with positive type silver halide emulsion layers onto the transparent support thereof and the reflective type light-sensitive materials, that is, the positive type silver halide color photographic light-sensitive materials provided with positive type silver halide emulsion layers onto the reflective type support thereof may freely be used without any special operation and images excellent in color reproducibility and high in quanlity can be finished.

What is claimed is:

1. An apparatus for forming images comprising
    a means for scanning an original,
    a means for exposing a silver halide photographic light-sensitive material with the image of said original,
    a means for interchangeably setting up at least two kinds of magazines storing a transparent and reflective silver halide photographic light-sensitive material, respectively,
    a means for processing said silver halide photographic light-sensitive materials,
    a means for conveying said silver halide photographic light-sensitive materials through said processing means, and
    a means for uniformly exposing said silver halide photographic light-sensitive materials image-wise exposed,
    in which the light amount of the image exposure, the conveying speed of said conveying means and the light amount of the uniform exposure are respectively automatically changed corresponding with the kind of said silver halide photographic light-sensitive material.

2. The apparatus of claim 1, wherein said different kinds of magazine respectively have a means for discriminating the kind of said magazine.

3. The apparatus of claim 1, wherein said setting up means for the magazine has a means for detecting said discriminating means of said magazine.

4. The apparatus of claim 3, wherein said image-wise exposing means, said conveying means, and said uniformly exposing means have means for changing the light amount of image-wise exposure, a means for changing the conveying speed and a means for changing the light amount of uniform exposure to predetermined values according to a signal from said detecting means, respectively.

5. The apparatus of claim 3, wherein said apparatus further comprises a means for replenishing a processing solution into said means for precessing said silver halide photographic light-sensitive material, and which has a means for changing a replenishing amount of said processing solution to a predeterminde value according to a signal from said detecting means.

6. The apparatus of claim 1, wherein said transparent and refrective silver halide photographic light-sensitive material are a transparent color posotive photographic light-sensitive material and a refrective silver halide color positive photographic light-sensitive material, respectively.

7. The aparatus of claim 1, wherein the conveying speed for said transparent silver halide photographic light-sensitive material is predetermined within the range from 1.2 to 2 times of the conveying speed for said reflective silver halide photographic light-sensitive material.

8. An apparatus for forming an image on a plurality of kinds of silver halide photographic light-sensitive material, each kind of said material being stored in a separate magazine detachably mounted on said apparatus, said apparatus comprising
    means for scanning an original,
    conveying means for moving said material from said magazine to an exposing means and to a processing means,
    said exposing means for imagewise exposing said material conveyed from said magazine,
    said processing means comprising a developing tank and a fixing tank,
    detecting means for detecting which of said kinds of said material is stored in said magazine, and
    changing means for adjusting a conveying speed of said conveying means in response to said detecting means whereby an exposure amount and/or processing time are automatically changed in accordance with said kind of said material in said magazine.

9. The apparatus of claim 8 wherein said charging means adjusts said speed to change both said amount and said processing time.

10. An apparatus for forming an image on a plurality of kinds of silver halide photographic light-sensitive material, each kind of said material being stored in a separate magazine capable of being detachably mounted on said apparatus, said apparatus comprising;
    detecting means for detecting which of said kinds of said material is stored in said magazine being mounted,
    conveying means for moving said material from said mounted magazine to an exposing means,
    said exposing means imagewise exposing said material,
    a processing means comprising a developing tank and a fixing tank,
    said conveying means being capable of changing the conveying speed and further moving said exposed material through said processing means at a processing speed,
    change means for controlling said exposing means and said conveying means in response to said detecting means whereby an exposure amount and/or the processing speed are automatically changed in accordance with said kind of said material in said mounted magazine.

11. The apparatus of claim 10 wherein said exposure means comprises a light source and said change means controls electric power being supplied to said light source.

12. The apparatus of claim 10 wherein said exposure means comprises a means for scanning an original and imagewise exposed said material while said material is moved at a conveying speed by said conveying means, and said change means controls the conveying speed of said conveying means.

13. The apparatus of claim 10 wherein said exposure means comprises an aperture through which the imagewise exposure of said material is performed and said change means controls an aperture size.

14. The apparatus of claim 10 wherein said plurality of kinds of silver halide photographic material is at least two including a transparent type and a reflective type.

15. The apparatus of claim 10 wherein said magazine comprises a discriminating means for determining which said kind of said material is stored therein, and said detecting means detects said kind of said material through said discriminating means.

* * * * *